Nov. 17, 1959
N. VILLADSEN
2,913,097
MANURE LOADER
Filed May 8, 1956
2 Sheets-Sheet 2
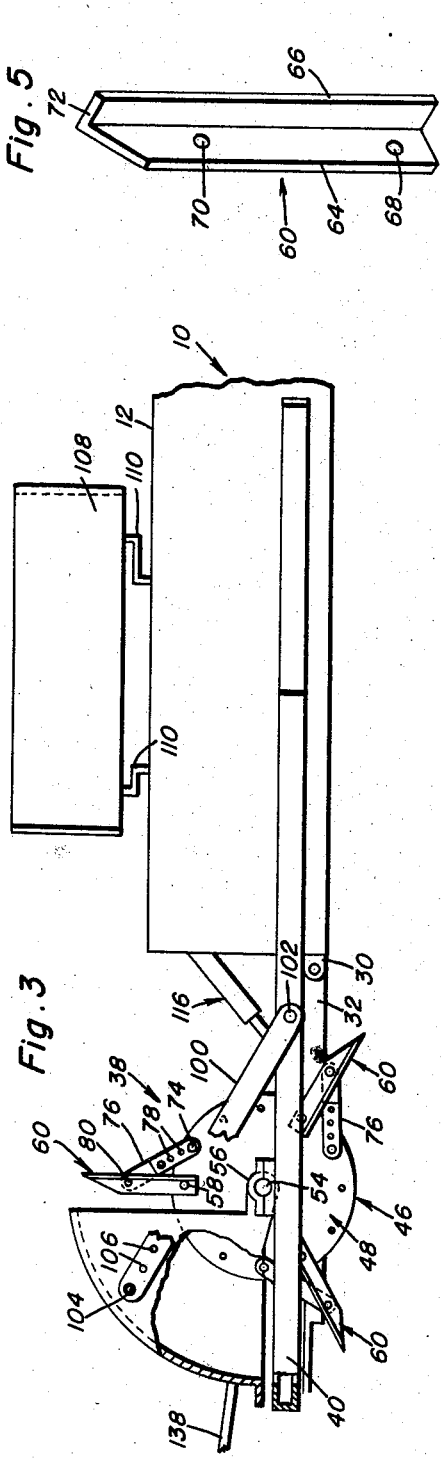
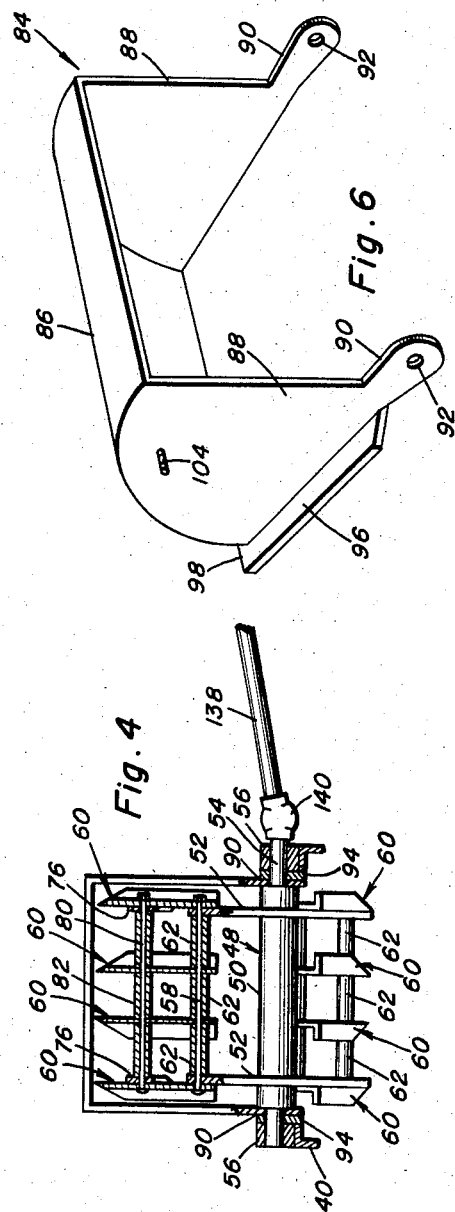
Niels Villadsen
INVENTOR.
BY
*Clarence A. O'Brien*
*and Harvey B. Jackson*
Attorneys

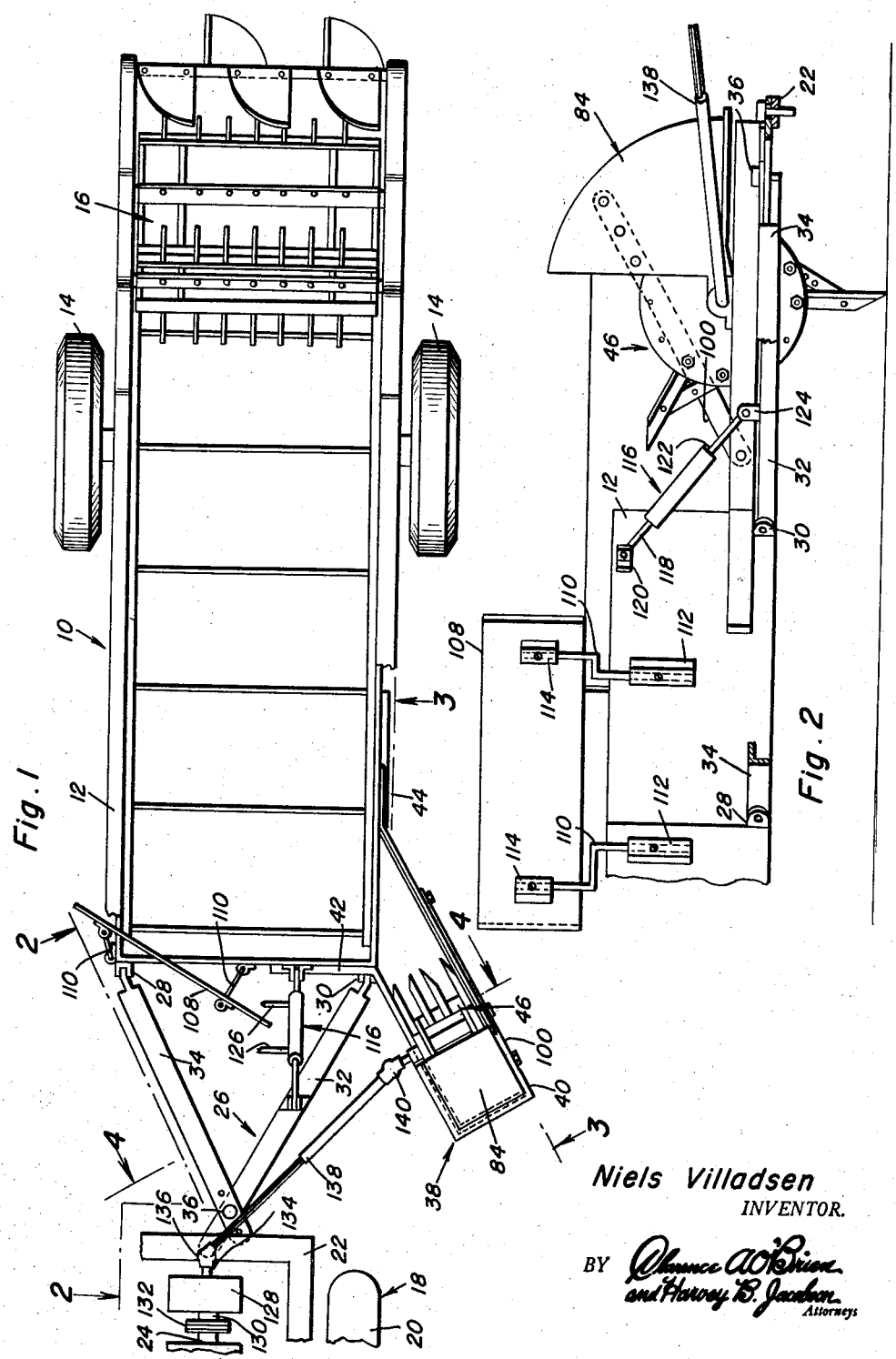

United States Patent Office 2,913,097
Patented Nov. 17, 1959

2,913,097

MANURE LOADER

Niels Villadsen, Duffield, Alberta, Canada

Application May 8, 1956, Serial No. 583,462

6 Claims. (Cl. 198—9)

This invention relates in general to new and useful improvements in farm equipment, and more specifically to an improved manure loader.

At the present time manure spreaders are either hand loaded or loaded through the use of separate manure loaders. When the farm is large enough, there is generally on hand a manure loader. However, the manure loader requires that it be connected to a tractor for operating the same. As a result, during the short period of time which the manure spreader is being loaded there will require two tractors, one drawing the manure spreader and the other drawing and driving the manure loader. In many instances farms are so small that there are not two tractors with the result that tractors drawing manure loaders cannot be utilized in conjunction with a loading operation of a manure spreader.

It is therefore the primary object of this invention to provide an improved manure loader which is so constructed whereby it may be readily mounted on a manure spreader and driven by the tractor drawing the manure spreader so that a single tractor may draw the manure spreader and operate the manure loader simultaneously.

Another object of this invention is to provide an improved manure loader which is so constructed whereby it may be attached to either existing or new manure spreaders with a minimum of changes in the construction of the manure spreader.

Still another object of this invention is to provide an improved manure loader which is of extremely simple construction and which may be so mounted on a manure spreader whereby it may be driven from the power take-off of a tractor drawing the manure spreader, the manure loader being both low in initial cost and economical in operation.

A further object of this invention is to provide an improved manure loader for manure spreaders, the manure loader being mounted on the manure spreader and being provided with suitable drive means for directing manure being loaded into the desired portion of the spreader box of the manure spreader.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a manure spreader equipped with the manure loader, which is the subject of this invention, the manure spreader being connected to a rear portion of a farm tractor;

Figure 2 is an enlarged fragmentary vertical sectional view taken substantially upon the plane indicated by the section line 2—2 of Figure 1 and shows the specific details of mounting of a detector board carried by the forward portion of the spreader box and the details of the manure loader per se;

Figure 3 is an enlarged fragmentary vertical sectional view taken substantially upon the plane indicated by the section line 3—3 of Figure 1 and shows further the details of the manure loader;

Figure 4 is an enlarged fragmentary vertical sectional view taken substantially upon the plane indicated by the section line 4—4 of Figure 1 and shows the specific details of the digging means of the manure loader;

Figure 5 is an enlarged perspective view of one of the digging elements of the digging means; and Figure 6 is an enlarged perspective view of a hood for directing the flow of manure dug by the rotary digging means whereby it is directed into the spreader box.

Referring now to the drawings in detail, it will be seen that there is illustrated in Figure 1 a manure spreader which is referred to in general by the reference numeral 10. The manure spreader 10 includes a spreader box 12 which is supported by a pair of wheels 14. Mounted within the spreader box are manure spreading means 16 which are suitably driven to automatically convey manure rearwardly from within the spreader box 12 and to broadcast it over the desired area of a field. The manure spreading means 16 may be driven either from the wheels 14 or from a drive shaft (not shown) which may be attached to a power take-off of a tractor.

Drawing the manure spreader 10 is a conventional farm tractor which is referred to in general by the reference numeral 18, only the rear portion of the farm tractor 18 being illustrated. The farm tractor 18 includes a left rear wheel 20, a draw bar 22 and a power take-off shaft 24 among other structural details.

In order that the manure spreader 10 may be drawn behind the farm tractor 18 with the left side of the spreader 10 aligned with the left rear wheel 20, there is provided a suitable hitch which is referred to in general by the reference numeral 26. The hitch 26 includes a pair of ears 28 and 30 secured to the front of the spreader box 12 at opposite corners thereof. Pivotally connected to the ear 30 and extending forwardly therefrom in diagonal relation is a first hitch bar 32 which is suitably connected to the draw bar 12 for pivotal movement. Pivotally connected to the ear 28 is a second hitch bar 34 which is adjustably secured to a forward portion of the hitch bar 32 by means of a pin 36. By varying the relationship between the hitch bars 32 and 34, the relative position of the spreader box 12 with respect to the tractor 18 may be varied so as to shift the spreader box 12 transversely into the desired alignment with the tractor 18.

Carried by the forward portion of the spreader box 12 is the manure loader which is the subject of this invention, the manure loader being referred to in general by the reference numeral 38. The manure loader 38 includes a generally U-shaped supporting frame 40 which extends forwardly and outwardly from the left front corner of the spreader box 12 and is secured to the front of the spreader box 12 as at 42 and to the left side of the spreader box 12 as at 44. The supporting frame 40 may be of any desired construction and may be braced as deemed necessary for the proper supporting thereof from the spreader box 12. Further, the supporting frame 40 may be mounted equally as well on the right corner of the spreader box 12 or, in cases of necessity, on the front of the spreader box 12.

The manure loader 38 also includes rotary digging means which are referred to in general by the reference numeral 46. The rotary digging means 46 is formed of a hub assembly 48 which includes an elongated sleeve 50 having mounted thereon adjacent opposite ends thereof a pair of circular plates 52. Extending through the sleeve 50 is a shaft 54 which is suitably journaled in a pair of pillow blocks 56 carried by the supporting frame 40.

Extending between the plates 52 and carried thereby in circumferentially spaced relation is a first set of support rods 58 which have mounted thereon a plurality of transversely spaced digging elements 60. The digging elements 60 are mounted for pivotal movement and are spaced from each other by a suitable sleeve 62 carried by the first rods 58.

Referring now to Figure 5 in particular, it will be seen that there is illustrated one of the digging elements 60. Each digging element 60 is annular in cross-section and includes a first flange 64 and a second flange 66, the flanges 64 and 66 being disposed at right angles to each other. The flange 64 is provided with a pair of longitudinally spaced apertures 68 and 70. The outer end of the digging element 60 is cut off at an angle to form a digging edge 72 on the other end of the flange 66. Each digging element 60 is mounted on its associated rod 58 by passing the rod through its aperture 68.

In order that the digging elements 60 may be disposed at the desired angle, there is carried by the plates 52 a second support rod 74 for each support rod 58. Carried by the support rod 74 are braces 76. The braces 76 are provided with a plurality of apertures 78 in which the associated support rod 74 is positioned so as to vary the effective length of the braces 76. The outer ends of the braces 76 are connected to a connecting rod 80 which extends through the apertures 70 in the digging elements 60. The connecting rod 80 serves to connect together the outer portions of the digging elements 60 and in addition to being passed through the braces 76 and the digging elements 60, have positioned thereon suitable spacers 82 for spacing the support elements 60. By selectively positioning the support rod 74 in the apertures 78, the desired angle of the digging element 60 may be obtained.

Referring now to Figure 6 in particular, it will be seen that there is illustrated a hood which is referred to in general by the reference numeral 84. The hood 84 includes a curved body portion 86 which has positioned at opposite ends thereof pie-shaped end plates 88. The pie-shaped end plates 88 terminate at their apices in elongated ears 90 having mounting apertures 92 therein. The mounting apertures 92 have received therein the shaft 54 so that the hood 84 is pivotally mounted on the shaft 54. The ears 90 are spaced from the pillow blocks 56 by means of suitable spacers 94, as is best illustrated in Figure 4.

If desired, the hood 84 may be stiffened by the provision of suitable flanges 96 along the lower edges of the end plates 88. Formed integral with the flanges 96 may be a flange 98 extending outwardly from the lower part of the body portion 86. The flanges 96 and 98 may rest upon the supporting frame 40 to position the hood 84, if so desired.

It is to be understood that the hood 84 cooperates with the rotary digging means 46 to direct the flow of manure dug by the rotary digging means 46 into the spreader box 12. In order that the hood 84 may be more effective in its operation, it may be retained in an adjusted position. This is accomplished by the use of an elongated brace 100 which has its lower end pivotally connected to to the supporting frame 40 by means of a pivot pin 102. Carried on one of the end plates 88 is a pin 104 which is selectively received in one of a plurality of apertures 106 formed in the upper end of the brace 100. Thus the brace 100 may be used to adjustably position the hood 84 to control the flow of manure from the rotary digging means 46.

In order to direct any stray manure down into the spreader box 12, there is carried by the forward portion of the spreader box 12 a deflector board 108. The deflector board 108 is supported by a pair of crank arms 110 whose lower ends are received in suitable brackets 112 carried by the front portion of the spreader box 12 and whose upper ends are received in suitable brackets 114 carried by the deflector board 108. By utilizing the crank support arms 110, the deflector board 108 may be positioned as necessary.

It is desirable that the rotary digging means 46 be vertically adjusted. In order to accomplish this, there is provided a fluid motor which is referred to in general by the reference numeral 116. The fluid motor 116 is provided at one end with a mounting rod 118 which is pivotally connected to the forward end of the spreader box 12 by means of a mounting bracket 120. The fluid motor 116 also includes an extensible rod 122 whose lower end is pivotally connected to the hitch bar 32 by means of a suitable bracket 124. The fluid motor 116 also includes suitable fluid lines 126 which may be connected to the hydraulic system (not shown) of the tractor 18 whereby the spreader box 12 may be selectively raised and lowered thus vertically positioning the rotary digging means 46 as desired.

Carried by the rear part of the tractor 18 is a suitable gear box 128. The gear box 128 includes an input shaft 130 which is coupled to the power take-off shaft 24 by means of a suitable coupling 32. The gear box 128 also includes at least one output shaft 134 to which there is coupled a universal fitting 136. Connected to the universal fitting 136 is one end of a telescoping drive shaft 138. A second universal fitting 140 couples the drive shaft 138 to the shaft 54 for rotating the rotary digging means 46.

From the foregoing description of the manure loader 38, it will be readily apparent that the manure spreader 10 may be towed behind the farm tractor 18 through a desired manure deposit. By utilizing the manure loader 38 which has the rotary digging means 46 thereof driven from the tractor 18, the manure may be dug and loaded into the manure spreader 10 in a single operation. The loading of the manure into the manure spreader 10 takes a relatively short time and after the loading operation has been accomplished, it is merely necessary for the same farm tractor to draw the manure spreader 10 into the field and to distribute the manure as is deemed necessary.

It is pointed out that the gear box 128 is illustrated as having a single output shaft 134. If desired, an additional output shaft (not shown) may be provided so that the spreader assembly 16 of the manure spreader 10 may be driven from the power take-off shaft 24 of the tractor 18. In such event, an additional drive chain will be provided between the spreader assembly 16 and the gear box 128. Inasmuch as such a drive is conventional in manure spreaders, a further description thereof is not believed to be necessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a wagon type vehicle of the type including a pair of transversely aligned wheels, and a combination hitch and front support, a loader, said loader including a supporting frame rigidly secured to said vehicle and projecting exteriorly thereof at the front end thereof, rotary ground engaging digging means carried by said supporting frame and projecting therebelow, means pivotally connecting said combination hitch and front support to said vehicle, and means extending between said vehicle and said combination hitch and front support for vertically positioning said vehicle front end whereby said rotary ground engaging digging means is vertically positioned.

2. In combination with a wagon type vehicle of the type including a pair of transversely aligned wheels, and a combination hitch and front support, a loader, said loader including a supporting frame rigidly secured to said vehicle and projecting exteriorly thereof at the front end thereof, rotary ground engaging digging means carried by said supporting frame and projecting therebelow, means pivotally connecting said combination hitch and front support to said vehicle, and means extending between said vehicle and said combination hitch and front support for vertically positioning said vehicle front end whereby said rotary ground engaging digging means is vertically positioned, and a hood secured to said supporting frame and overlying said rotary ground engaging digging means for directing material being dug into said vehicle.

3. In combination with a wagon type vehicle, a loader, said loader including a supporting frame rigidly secured to said vehicle at a corner thereof and projecting diagonally outwardly from said vehicle, rotary ground engaging digging means carried by said supporting frame and projecting therebelow for digging material and throwing the material into said vehicle, and a deflector board mounted across an adjacent corner of said vehicle, the deflector board being generally vertically disposed and extending generally towards the rotary ground engaging digging means to assure the passage of material dug by said rotary ground engaging digging means into said vehicle.

4. In combination with a wagon type vehicle of the type including a pair of transversely aligned wheels and a combination hitch and front support, a loader, said loader including a supporting frame rigidly secured to said vehicle at a forward corner thereof and projecting outwardly and forwardly therefrom, rotary ground engaging digging means carried by said supporting frame and projecting therebelow, a deflector broad carried by the other corner of the front end of said vehicle, said deflector board being generally vertically disposed and extending towards said rotary ground engaging digging means whereby material dug by said rotary ground engaging digging means is directed into said vehicle, and means extending between said vehicle and said combination hitch and front support for vertically positioning said vehicle front end whereby said rotary ground engaging digging means is vertically positioned.

5. In combination with a wagon type vehicle of the type including a pair of transversely aligned wheels and a combination hitch and front support, a loader, said loader including a supporting frame rigidly secured to said vehicle at a forward corner thereof and projecting outwardly and forwardly therefrom, rotary ground engaging digging means carried by said supporting frame and projecting therebelow, a deflector board carried by the other corner of the front end of said vehicle, said deflector board being generally vertically disposed and extending towards said rotary ground engaging digging means whereby material dug by said rotary ground engaging digging means is directed into said vehicle, and means extending between said vehicle and said combination hitch and front support for vertically positioning said vehicle front end whereby said rotary ground engaging digging means is vertically positioned, and a hood secured to said supporting frame and overlying said rotary ground engaging digging means for directing material being dug into said vehicle.

6. In combination with a wagon type vehicle, a loader, said loader including a supporting frame rigidly secured to said vehicle at a corner thereof and projecting diagonally outwardly from said vehicle, rotary ground engaging digging means carried by said supporting frame and projecting therebelow for digging material and throwing the material into said vehicle, and a deflector board mounted across an adjacent corner of said vehicle, the deflector board being generally vertically disposed and extending generally towards the rotary ground engaging digging means to assure the passage of material dug by said rotary ground engaging digging means into said vehicle, said deflector board having support means extending upwardly from said vehicle, said support means being in the form of crank arms whereby said deflector board may be shifted relative to said vehicle.

References Cited in the file of this patent

UNITED STATES PATENTS

| | | |
|---|---|---|
| 893,749 | Nichols | July 21, 1908 |
| 1,293,229 | Speelman | Feb. 4, 1919 |
| 1,442,980 | Shodenhelm | Jan. 23, 1923 |
| 1,463,492 | Varland | July 31, 1923 |
| 2,368,422 | Oberkamper | Jan. 30, 1945 |
| 2,729,002 | Hedgecock | Jan. 3, 1956 |